United States Patent
Yoo

(10) Patent No.: US 12,450,315 B2
(45) Date of Patent: Oct. 21, 2025

(54) METHOD AND SYSTEM FOR PERFORMING PREDICTION WORK ON TARGET IMAGE

(71) Applicant: LUNIT INC., Seoul (KR)

(72) Inventor: In Wan Yoo, Seoul (KR)

(73) Assignee: LUNIT INC., Seoul (KR)

( * ) Notice: Subject to any disclaimer, the term of this patent is extended or adjusted under 35 U.S.C. 154(b) by 486 days.

(21) Appl. No.: 17/671,936

(22) Filed: Feb. 15, 2022

(65) Prior Publication Data
US 2022/0172009 A1  Jun. 2, 2022

Related U.S. Application Data

(63) Continuation of application No. PCT/KR2021/015734, filed on Nov. 2, 2021.

(30) Foreign Application Priority Data

Nov. 2, 2020  (KR) .................. 10-2020-0144411

(51) Int. Cl.
*G06F 18/2415* (2023.01)
*G06F 18/2431* (2023.01)
*G06T 7/11* (2017.01)

(52) U.S. Cl.
CPC ...... *G06F 18/2415* (2023.01); *G06F 18/2431* (2023.01); *G06T 7/11* (2017.01); *G06T 2207/20021* (2013.01)

(58) Field of Classification Search
CPC .... G06F 18/2415; G06F 18/2431; G06T 7/11; G06T 2207/20021; G06T 2207/10056; G06T 2207/20081; G06T 2207/20084; G06T 2207/30024; G06T 7/0012; G06T 3/40; G06T 3/4007; G06V 10/26;
(Continued)

(56) References Cited

U.S. PATENT DOCUMENTS

| | | | |
|---|---|---|---|
| 11,900,610 B2 * | 2/2024 | Kao | ........................ G06T 7/70 |
| 2017/0236292 A1 * | 8/2017 | Lin | ........................ G06T 7/194 |
| | | | 382/173 |
| 2020/0258223 A1 | 8/2020 | Yip et al. | |

(Continued)

FOREIGN PATENT DOCUMENTS

CN  111369512 A  *  7/2020  ........... G06K 9/0014

OTHER PUBLICATIONS

L. Chan "HistoSegNet: Semantic Segmentation of Histological Tissue Type in Whole Slide Images," 2019 IEEE/CVF International Conference on Computer Vision (ICCV), Seoul, Korea (South), 2019, pp. 10661-10670, doi: 10.1109/ICCV.2019.01076. https://ieeexplore.ieee.org/document/9009552 (Year: 2019).*

(Continued)

*Primary Examiner* — Matthew C Bella
*Assistant Examiner* — Andrew B. Jones
(74) *Attorney, Agent, or Firm* — Sughrue Mion, PLLC

(57) ABSTRACT

Provided is a method for performing a prediction work on a target image, including dividing the target image into a plurality of sub-images, generating prediction results for a plurality of pixels included in each of the plurality of divided sub-images, applying weights to the prediction results for the plurality of pixels, and merging the prediction results for the plurality of pixels applied with the weights.

19 Claims, 11 Drawing Sheets

(58) Field of Classification Search
CPC .... G06V 10/809; G06V 10/82; G06V 20/698; G06N 5/04
See application file for complete search history.

(56) References Cited

U.S. PATENT DOCUMENTS

2020/0302224 A1* 9/2020 Jaganathan ........... G06F 18/217
2024/0257293 A1* 8/2024 Yip ..................... G06V 10/764

OTHER PUBLICATIONS

Extended European Search Report from the European Patent Office in Application No. 21802585.6.
Chan, Lyndon et al., "HistoSeg Net: Semantic Segmentation of Histological Tissue Type in Whole Slide Images", 2019 IEEE/CVF International Conference on Computer Vision (ICCV), Oct. 27, 2019, pp. 10661-10670 (10 pages total).
Feng, Yanbo et al., "A deep learning based multiscale approach to segment cancer area in liver whole slide image", Arxiv.org, Cornell University Library, Jul. 25, 2020, 12 pages total.
Campanella et al., Clinical-grade computational pathology using weakly supervised deep learning on whole slide images, published Aug. 11, 2020, available at https://www.ncbi.nlm.nih.gov/pmc/articles/PMC7418463/.†
Graham et al., "Simultaneous Segmentation and Classification of Nuclei in Multi-Tissue Histology Images," published Nov. 13, 2019, available at https://arxiv.org/abs/1812.06499.†
Ilse et al., "Attention-based Deep Multiple Instance Learning," published Jun. 28, 2018, available at https://arxiv.org/pdf/1802.04712.pdf.†
Isensee et al., "Breaking the Spell on Successful Medical Image Segmentation," published Apr. 17, 2019, available at https://arxiv.org/abs/1904.08128v1.†
Priego-Torres et al., "Automatic segmentation of whole-slide H&E stained breast histopathology images using a deep convolutional neural network architecture," published Aug. 1, 2020, available at https://www.sciencedirect.com/science/article/pii/S0957417420302116.†

\* cited by examiner
† cited by third party

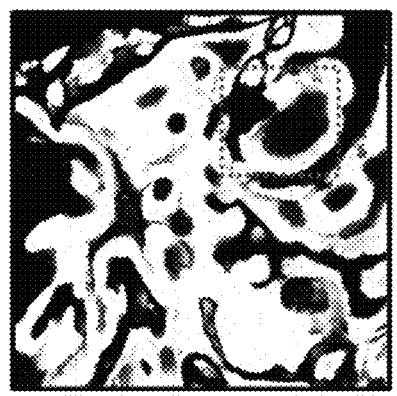
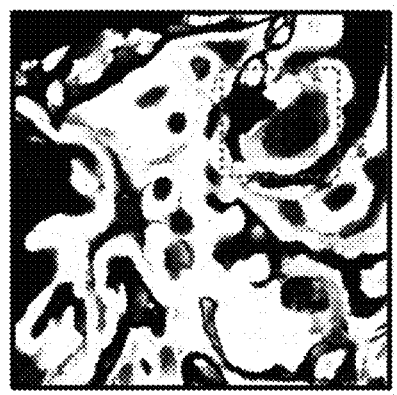
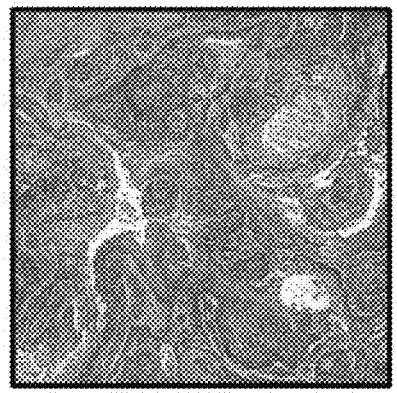
FIG. 10

METHOD AND SYSTEM FOR PERFORMING PREDICTION WORK ON TARGET IMAGE

CROSS-REFERENCE TO RELATED APPLICATIONS

This application is a continuation of International Application No. PCT/KR2021/015734 filed on Nov. 2, 2021, which claims priority to Korean Patent Application No. 10-2020-0144411 filed on Nov. 2, 2020, the entire contents of which are hereby incorporated by reference.

TECHNICAL FIELD

The present disclosure relates to a method and a system for performing a prediction work on a target image, and more specifically, to a method and a system for performing a prediction work on a target image by using prediction results for a plurality of sub-images in the target image.

BACKGROUND

In recent years, as hardware such as processors, memories, and cameras are fast developed, artificial intelligence (AI) technology has been developed and is receiving increasing attention. For example, researches on applying these AI technologies to the field of image processing is being actively conducted. In particular, AI technology is being used in the field of pathology slide image analysis for tissue samples. For example, a pathology slide image may be input to an object detection model to classify cells, tissues and/or structural regions included in the pathology slide image.

Meanwhile, since the pathology slide image is a high-resolution and high-capacity image, there is a problem in that a high-capacity and high-cost computational resource and memory are required to perform a prediction work using the pathology slide image directly. In order to compensate for this, the pathology slide image may be divided into a plurality of images, and a prediction work may be performed on the plurality of divided images. Then, in order to complete the prediction work on the pathology slide image, it may be necessary to merge the prediction works on the plurality of divided images. Since the prediction work is performed with the divided pathology slide images respectively, the result value of the prediction works in the vicinity of the split lines between the plurality of divided images may not be accurate. For example, a phenomenon may occur, in which the prediction results appear to be severed in the vicinities of split lines between a plurality of divided images. The inaccuracy of the prediction results in the vicinities of the split lines may deteriorate the prediction performance for the entire pathology slide.

SUMMARY

The present disclosure has been provided to solve the problems described above, and provides a method and a system for performing a prediction work on a target image.

The present disclosure may be implemented in a variety of ways, including a method, an apparatus, a system (e.g., a server system, a cloud system, and the like), or a computer-readable storage medium storing instructions, or a computer program.

According to an embodiment, a method for performing a prediction work on a target image is provided, which may include dividing the target image into a plurality of sub-images, generating prediction results for a plurality of pixels included in each of the plurality of divided sub-images, applying weights to the prediction results for the plurality of pixels, and merging the prediction results for the plurality of pixels applied with the weights.

According to an embodiment, the dividing the target image into the plurality of sub-images may include dividing the target image such that a portion of a first image included in the plurality of sub-images overlaps with a portion of a second image adjacent to the first image.

According to an embodiment, the applying the weights to the prediction results for the plurality of pixels may include applying bilinear weights to the prediction results for the pixels included in each of the plurality of sub-images.

According to an embodiment, the bilinear weights may be weights used for bilinear interpolation applied to the prediction results for the plurality of pixels, and each of the bilinear weights may be calculated as a value corresponding to each of the plurality of pixels.

According to an embodiment, the merging the prediction results for the plurality of pixels applied with the weights may include merging a prediction result applied with a first weight corresponding to a pixel included in the overlapping portion of the first image, with a prediction result applied with a second weight corresponding to a pixel included in the overlapping portion of the second image.

According to an embodiment, the generating the prediction results for the plurality of pixels included in each of the plurality of divided sub-images may include determining a class for each of the plurality of pixels, in which the class may be one of a plurality of classes representing a plurality of objects, and generating a prediction result including the determined class.

According to an embodiment, the determining the class for each of the plurality of pixels may include inputting each of the plurality of divided sub-images to a segmentation machine learning model to output a class for each of the plurality of pixels included in each of the plurality of sub-images.

According to an embodiment, the generating the prediction result including the determined class further may include determining values for a plurality of channels corresponding to the plurality of classes by using the class for each of the plurality of pixels.

According to an embodiment, the generating the prediction result including the determined class may further include generating an array corresponding to the prediction results for the plurality of pixels based on the determined values for the plurality of channels.

According to an embodiment, the applying the weights to the prediction results for the plurality of pixels may include applying each of the weights to each of the plurality of channels.

According to another embodiment, the disclosure may include a memory storing one or more instructions, and a processor configured to execute the stored one or more instructions to divide a target image into a plurality of sub-images, generate prediction results for a plurality of pixels included in each of the plurality of divided sub-images, apply weights to the prediction results for the plurality of pixels, and merge the prediction results for the plurality of pixels applied with the weights.

In some embodiments of the present disclosure, the processor can generate a prediction result for each of a plurality of sub-images divided from a target image, and apply the same weight or a different weight to each of the generated prediction results. Then, the prediction results applied with the weights can be merged to perform a prediction work on the target image. The weights can be determined so as to prevent performance degradation of the prediction result that can occur due to the merging between split lines between a plurality of sub-images, and as a result, the performance of the prediction result of the target image can be maintained or improved.

In some embodiments of the present disclosure, a prediction result for each of a plurality of sub-images included in the target image is applied with a bilinear weight and merged with each other, so that an error of appearance of discontinuity in the final prediction result at the boundary lines between the prediction results for a plurality of sub-images can be prevented, and damages to the results such as blurring, etc. of the final prediction result can be prevented. That is, the performance of the prediction work on the target image can be further improved.

In some embodiments of the present disclosure, overlapping regions between a plurality of sub-images and their adjacent sub-images in the target image can be determined in a size by considering prediction work speed, computational resources, memory, prediction performance, etc. That is, by determining the size of the overlapping region according to the hardware or resource environment, the performance for the optimal prediction work can be achieved.

The effects of the present disclosure are not limited to the effects described above, and other effects not described will be able to be clearly understood by those of ordinary skill in the art (hereinafter, referred to as "those skilled in the art") from the description of the claims.

BRIEF DESCRIPTION OF THE DRAWING

Embodiments of the present disclosure will be described with reference to the accompanying drawings described below, in which like reference numerals denote like elements, but are not limited thereto, in which:

FIG. 10 illustrates an example of prediction results for a pathology slide image generated by merging prediction results for a plurality of patches according to embodiments.

DETAILED DESCRIPTION

Figure 1:
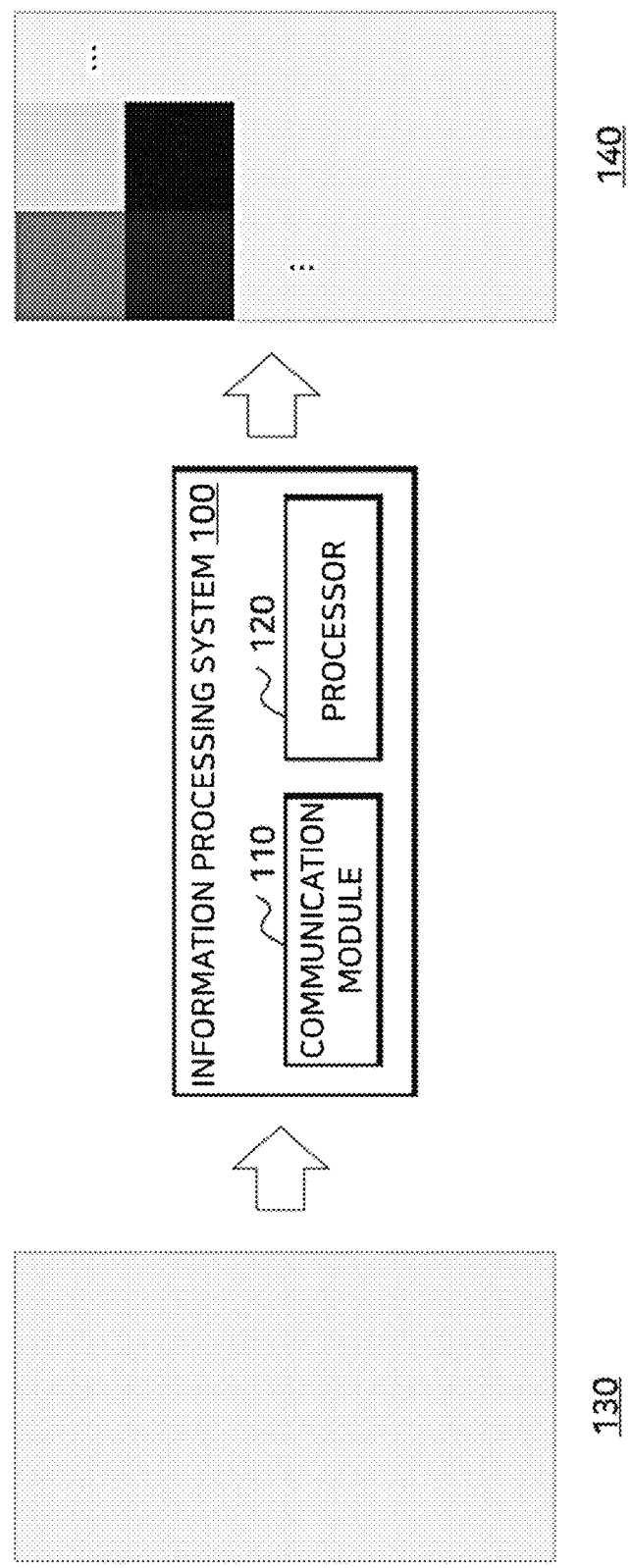
FIG. 1 illustrates an example of an information processing system performing a prediction work on a target image according to an embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in specific cases, the term may be arbitrarily selected by the applicant, and the meaning of the term will be described in detail in a corresponding description of the embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, or variables. Furthermore, functions provided in the components and the "modules" or "units" may be combined into a smaller number of components and "modules" or "units," or further divided into additional components and "modules" or "units."

According to an embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, etc. Under some circumstances, the "processor" may refer to an application-specific integrated circuit (ASIC), a programmable logic device (PLD), a field-programmable gate array (FPGA), etc. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In the present disclosure, the "system" may refer to at least one of a server device and a cloud device, but not limited thereto. For example, the system may include one or more server devices. In another example, the system may include one or more cloud devices. In another example, the system may be configured together with both a server device and a cloud device and operated.

In the present disclosure, "target image" and "sub-image" may refer to any image data or image data item that can be used for learning and/or prediction of a machine learning model. In the present disclosure, the whole pathology slide image and/or a plurality of patches included in the pathology slide image are explained as "target image" and "sub-image," but is not limited thereto, and any data that can be used for training a machine learning model may correspond to the "target image" and "sub-image." In addition, the "sub-images" may refer to some images extracted from the "target image." For example, when the "target image" is a pathology slide image, the "sub-images" may be a plurality of patches included in the pathology slide image. Alternatively, when the "target image" is a patch included in the pathology slide image, the "sub-image" may refer to a portion of the patch corresponding to the target image, that is, a patch having a smaller size than the patch corresponding to the target image.

In the present disclosure, "pixel" may refer to pixel included in the target image and/or the sub-image. For example, the pixel may refer to one pixel. As another example, the pixel may refer to a plurality of pixels, that is, to one pixel group.

In the present disclosure, the "pathology slide image" refers to an image obtained by capturing a pathological slide fixed and stained through a series of chemical treatments on a tissue torn off from a human body. In an example, the pathology slide image may refer to a whole slide image including a high-resolution image of the whole slide. For example, the pathology slide image may refer to a digital image captured with a microscope, and may include information on cells, tissues, and/or structures in the human body. In addition, the pathology slide image may include one or more patches. In the present disclosure, the "patch" may refer to a small region within the pathology slide image. For example, the patch may refer to a sub-image generated by dividing the pathology slide image in order to perform segmentation on the pathology slide image. Alternatively, the patch may include a region corresponding to a semantic object extracted by performing segmentation on the pathology slide image.

In the present disclosure, an "artificial neural network model" is an example of the machine learning model, and may include any model used to predict an answer to a given input. According to an embodiment, the artificial neural network model may include an artificial neural network model including an input layer, a plurality of hidden layers, and an output layer. In an example, each layer may include one or more nodes. For example, the artificial neural network model may be trained to predict class information for a plurality of pixels included in the target image and/or the sub-image. In addition, the artificial neural network model may include weights associated with a plurality of nodes included in the artificial neural network model. In an example, the weights may include any parameter that is associated with the artificial neural network model.

In the present disclosure, the "class" and "class information" may refer to classified information about cells, tissues, and/or structures in the patch. For example, the "class" and "class information" may represent objects such as lymphocytes such as helper T cells, killer T cells, natural killer T cells, memory T cells, suppressor T cells, B cells, etc., neutrophils, eosinophils, basophils, monocytes, red blood cells, platelets, etc. For example, the processor may determine pixels of a region corresponding to the lymphocyte in the target image and/or the sub-image as the lymphocyte class.

In the present disclosure, "each of a plurality of A" may refer to each of all components included in the plurality of A, or may refer to each of some of the components included in a plurality of A. For example, each of a plurality of sub-images may refer to each of all sub-images included in the plurality of sub-images or to each of some sub-images included in the plurality of sub-images. In the present disclosure, "a plurality of pixels included in each of the plurality of sub-images" may mean that each of the sub-images includes a plurality of pixels.

In the present disclosure, "prediction result" may refer to data itself output from the processor and/or to information displayed on an image based on the output data. The prediction result may be referred to as an output. In an embodiment, the prediction result may refer to display of various visual marks such as region marks, shape marks, color marks, texts, etc. representing each class in the target image and/or sub-image based on the data output from the processor. In another embodiment, the prediction result may refer to a matrix, vector, or array including values representing classes for each of a plurality of pixels. For example, when the value representing the normal cell class is 0, the value representing the cancer stroma class is 1, and the value representing the cancer epithelium class is 2, the prediction result for 2×2 pixels may be expressed as $$\begin{bmatrix} 1 & 0 \\ 2 & 0 \end{bmatrix}.$$

In another embodiment, the prediction result may include a plurality of channels corresponding to each of a plurality of classes, and include values for a plurality of channels determined according to a class for each of a plurality of pixels. For example, the prediction result may include $$\begin{bmatrix} 0 & 1 \\ 0 & 1 \end{bmatrix}$$

that is a value of the channel corresponding to the normal cell class, $$\begin{bmatrix} 1 & 0 \\ 0 & 0 \end{bmatrix}$$

that is the value of the channel corresponding to the cancer stroma class, and $$\begin{bmatrix} 0 & 0 \\ 1 & 0 \end{bmatrix}$$

that is the value of the channel corresponding to the cancer epithelium class.

In the present disclosure, the "final prediction result" may refer to a prediction result with respect to the target image, which may be generated by merging the prediction result for each of a plurality of sub-images included in the target image, for example.

In the present disclosure, the "prediction result on image" or the "prediction result of image" may include the prediction results on a plurality of pixels included in the image. Conversely, the "prediction result for a plurality of pixels" may refer to a prediction result for an image including the plurality of pixels or a prediction result of the image.

In the present disclosure, the "weight" may refer to a numerical value indicating a degree of reflecting the prediction result of each of the plurality of sub-images included in the target image when this is reflected to generate the prediction result for the target image. For example, according to the weight applied to each of the plurality of sub-images in the target image, the influence that the prediction result for each of the plurality of sub-images may have on the prediction result for the target image, that is, on the final prediction result, may be determined. The "weight" may be calculated and/or applied in units of pixels or in units of pixel groups including a plurality of pixels.

FIG. 1 illustrates an example of an information processing system 100 performing a prediction work on a target image 130 according to an embodiment. As illustrated, the information processing system 100 may include a communication module 110 and a processor 120. The information processing system 100 may receive the target image 130 for prediction work through the communication module 110. In this example, the target image may refer to a whole slide image (WSI) that is an image captured with a microscope. For example, the target image may include a pathology slide image or one or more patches included in the pathology slide image.

The processor 120 may perform a prediction work on the received target image 130. Meanwhile, in order for the processor 120 to perform the prediction work using the target image 130 as it is, a high-capacity and high-cost memory and computational resource may be required. In addition, when the prediction work is performed by using the high-resolution target image 130 as it is, the operation speed of the processor 120 may be slowed. Under these conditions, the processor 120 may divide the target image 130 into a plurality of sub-images before performing the prediction work.

The processor 120 may perform prediction works on a plurality of pixels included in each of the plurality of divided sub-images. For example, the processor 120 may determine a class for each of the plurality of pixels. In this case, the class may mean a target object such as cells, tissues, structures, etc. in the human body intended to be distinguished in the corresponding target image 130. In an embodiment, the processor 120 may include a machine learning model for performing prediction work(s). For example, the processor 120 may input each of the plurality of divided sub-images to a segmentation machine learning model, and output a class for each of a plurality of pixels included in each of the plurality of sub-images.

The processor 120 may merge all the prediction results for the plurality of pixels included in each of the plurality of sub-images, and output a final prediction result 140 for the target image 130. In this case, since the final prediction result 140 is generated by merging the prediction results for the plurality of sub-images, the prediction results at the boundary lines of the plurality of sub-images may not be smoothly connected. For example, when the prediction results of two sub-images in the vicinity of the boundary line are completely different from each other, the prediction results in the vicinity of the boundary line may appear to be severed. To prevent this, when the processor 120 divides the target image 130 into a plurality of sub-images, it may divide the sub-image such that each sub-image partially overlaps with another adjacent sub-image. In addition, the processor 120 may apply weights to certain regions where the prediction results of the plurality of sub-images overlap, and merge the weighted prediction results to generate a final prediction result for the target image.

The processor 120 may calculate weights for generating and/or outputting a final prediction result 140 with prediction results for a plurality of sub-images having smooth boundaries in the target image. According to an embodiment, the processor 120 may set different weights according to positions of respective pixels of the plurality of sub-images. For example, the processor 120 may apply bilinear weights to prediction results for pixels included in each of the plurality of sub-images. As another example, the weights may be set such that larger weights are applied to prediction results for pixels closer to the center in the plurality of sub-images than weights to be applied to prediction results for pixels closer to the edge in the plurality of sub-images. According to another embodiment, the processor 120 may determine that different weights are to be applied to at least some of the pixels of the plurality of sub-images, and that the same weight is to be applied to the remaining pixels. The weights determined as described above may be applied to prediction results for the plurality of sub-images.

Figure 2:
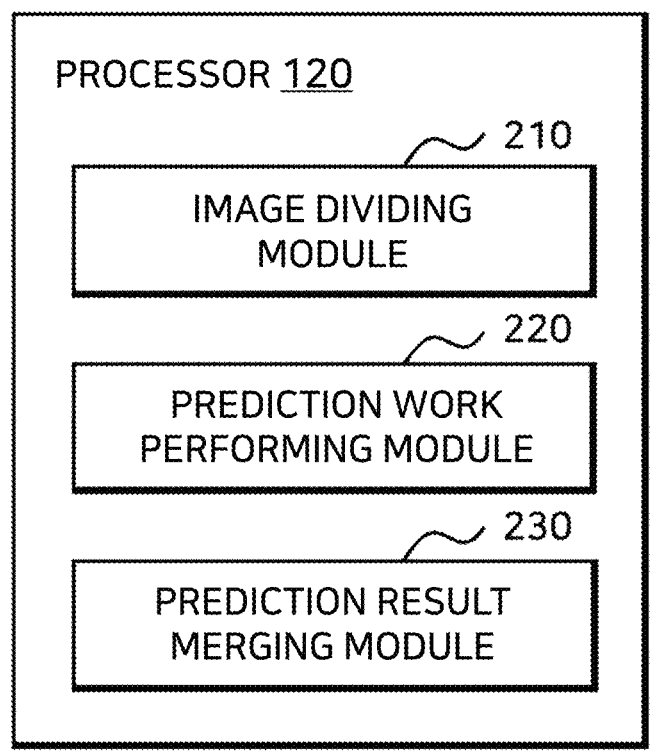
FIG. 2 is a block diagram illustrating an internal configuration of a processor according to an embodiment.

FIG. 2 is a block diagram illustrating an internal configuration of the processor 120 according to an embodiment. The processor 120 may include an image dividing module 210, a prediction work performing module 220, and a prediction result merging module 230. The image dividing module 210 may divide the target image into a plurality of sub-images. In this case, the target image may be the whole slide image, and the sub-images may correspond to patches of the whole slide image. In an embodiment, the image dividing module 210 may divide the target image such that a plurality of sub-images partially overlap with other adjacent sub-images. For example, the image dividing module 210 may divide the image such that a portion of the first image included in the plurality of sub-images overlaps with a portion of the second image adjacent to the first image. Accordingly, when one sub-image is a rectangle, there is four adjacent sub-images, and the one sub-image may be divided to overlap with at least one sub-image among the four adjacent sub-images.

The prediction work performing module 220 may perform a prediction work on a plurality of pixels included in each of the plurality of divided sub-images. In an embodiment, the prediction work performing module 220 may determine a class for each of the plurality of pixels. For example, the prediction work performing module 220 may input each of the plurality of divided sub-images to a segmentation machine learning model, and output a class for each of a plurality of pixels included in each of the plurality of sub-images. In this case, the class may be one of a plurality of classes representing a plurality of objects.

In an embodiment, the prediction work performing module 220 may generate a prediction result including the determined class. For example, the prediction work performing module 220 may use the class for each of the plurality of pixels to determine values for a plurality of channels corresponding to the plurality of classes. Additionally, the prediction work performing module 220 may generate a set (e.g., an array, etc.) corresponding to the prediction results for the plurality of pixels based on the determined values for the plurality of channels. Here, the size of the generated array may be a value (w*h*c) obtained by multiplying the width (w) of each of the plurality of sub-images, the height (h) of each of the plurality of sub-images, and the size (c) of the plurality of channels.

The prediction result merging module 230 may apply weights to the prediction results for a plurality of pixels. In an embodiment, the prediction result merging module 230 may apply bilinear weights to prediction results for pixels included in each of the plurality of sub-images. For example, the bilinear weights are weights used for bilinear interpolation applied to the prediction results for a plurality of pixels, and each of the bilinear weights may be calculated as values corresponding to each of the plurality of pixels. For example, this bilinear weight may be calculated using Equation 1 below. In another embodiment, when the prediction result includes a plurality of channels, the prediction result merging module 230 may apply a weight to each of the plurality of channels. Then, the prediction result merging module 230 may merge the prediction results for the plurality of pixels applied with the weights. In an embodiment, the prediction result merging module 230 may merge a prediction result applied with the weight corresponding to the pixel included in the overlapping portion of the first image, with a prediction result applied with the weight corresponding to the pixel included in the overlapping portion of the second image. That is, the prediction result merging module 230 may calculate a final prediction result by merging the weighted prediction result for each of sub-images in a partially overlapping manner.

In an embodiment, the prediction result merging module 230 may initialize an array for each of the final result and the final weight to zero (0) and generate a bilinear weight array. Then, the prediction result merging module 230 may add the result of multiplying the prediction result for each sub-image (e.g., patch) by the weight for each channel to the initialized final result array, and add the bilinear weights to the final weight array. That is, the prediction result merging module 230 may arrange the weighted prediction results for the plurality of sub-images according to positions of the plurality of sub-images in the target image, and merge the weighted prediction results. Then, the prediction result merging module 230 may divide the value of each pixel in the final result array by the final weight value of the corresponding pixel in the final weight array to calculate the final prediction result. In an example, to avoid dividing the value for each pixel in the final result array by zero, dividing by the final weight value may be done only when the final weight value is greater than zero, or dividing may be done by a value obtained by adding a very small number such as epsilon to the final weight value. For example, the prediction result merging mo1dule 230 may calculate the final prediction result based on Equations 1 to 8 below.

$$W_{w,h}(x, y) = \frac{\left|\lfloor \frac{w}{2} \rfloor - x\right| \cdot \left|\lfloor \frac{h}{2} \rfloor - y\right|}{\lfloor \frac{w}{2} \rfloor \cdot \lfloor \frac{h}{2} \rfloor} \qquad <\text{Equation 1}>$$

$(0 \leq x < w \text{ and } 0 \leq y < h)$ $$W_{w,h}(x, y) = 0 \qquad <\text{Equation 2}>$$

$(x < 0 \text{ or } x \geq w \text{ or } y < 0 \text{ or } y \geq h)$

Equations 1 and 2 above may represent equations for determining bilinear weights to be applied to prediction results for sub-images. Here, $W_{w,h}(x,y)$ in Equation 1 may mean a weight value for each pixel in a weight mask corresponding to each sub-image. Here, the weight mask may refer to a set of weights to be applied to the pixels in the sub-image.

In addition, w and h may represent a horizontal length and a vertical length of the mask, respectively. As shown in Equation 1, x may refer to one value in a range from 0 to w−1, and y may refer to one value in a range from 0 to h−1. Accordingly, may represent one pixel in the weight mask. In addition, as shown in Equation 2, the weights to be applied to the prediction results for the pixels included in the region outside the weight mask, that is, $W_{w,h}(x,y)$ may be all defined as 0. Here, the horizontal length and vertical length of the weight mask may be the same as the horizontal length and vertical length of the sub-image, respectively.

$$\forall 0 \leq i < N, S_i(x,y) = 0 (x < 0 \text{ or } x \geq w \text{ or } y < 0 \text{ or } y \geq h) \qquad <\text{Equation 3}>$$

where N denotes the number of sub-images, and $S_i$ denotes the prediction result of the $i$th sub-image. Equation 3 may represent that, in the $i$th sub-image, the prediction result included in the region outside the region applied with the weight mask, that is, $S_i(x,y)$ is defined as 0.

$$\forall 0 \leq i < N, P_i(x,y) = S_i(x-x_i, y-y_i) \odot W(x-x_i, y-y_i) \qquad <\text{Equation 4}>$$

where, $x_i$, $y_i$ denote the upper-left coordinate of the $i$th sub-image among the plurality of sub-images, and $P_i$ denotes the result of applying the weights to the prediction results for the $i$th sub-image.

$$\forall 0 \leq i < N, M_i(x,y) = W(x-x_i, y-y_i) \qquad <\text{Equation 5}>$$

where $M_i$ denotes a weight mask applied to the $i$th sub-image.

$$P(x, y) = \sum_{0 \leq i < N} P_i(x, y) \qquad <\text{Equation 6}>$$

As shown in Equation 6, the prediction result merging module 230 may sum the prediction results for the plurality of sub-images applied with the weights to calculate a value (P(x,y)) for each coordinate (each pixel).

$$M(x, y) = \sum_{0 \leq i < N} M_i(x, y) \qquad < \text{Equation 7} >$$

In addition, as shown in Equation 7, the prediction result merging module 230 may sum the weight masks for the sub-images to calculate a final weight value (M(x,y)) for each coordinate.

$$F(x, y) = \frac{P(x, y)}{M(x, y) + \varepsilon} \qquad < \text{Equation 8} >$$

Then, as shown in Equation 8, for each coordinate, the prediction result merging module 230 may calculate a final prediction result (F(x,y)) by dividing the calculated value P(x,y) for each coordinate by the final weight value M(x,y). Here, ε (epsilon) refers to a very small number, which may refer to a predetermined value, for example.

Figure 3:
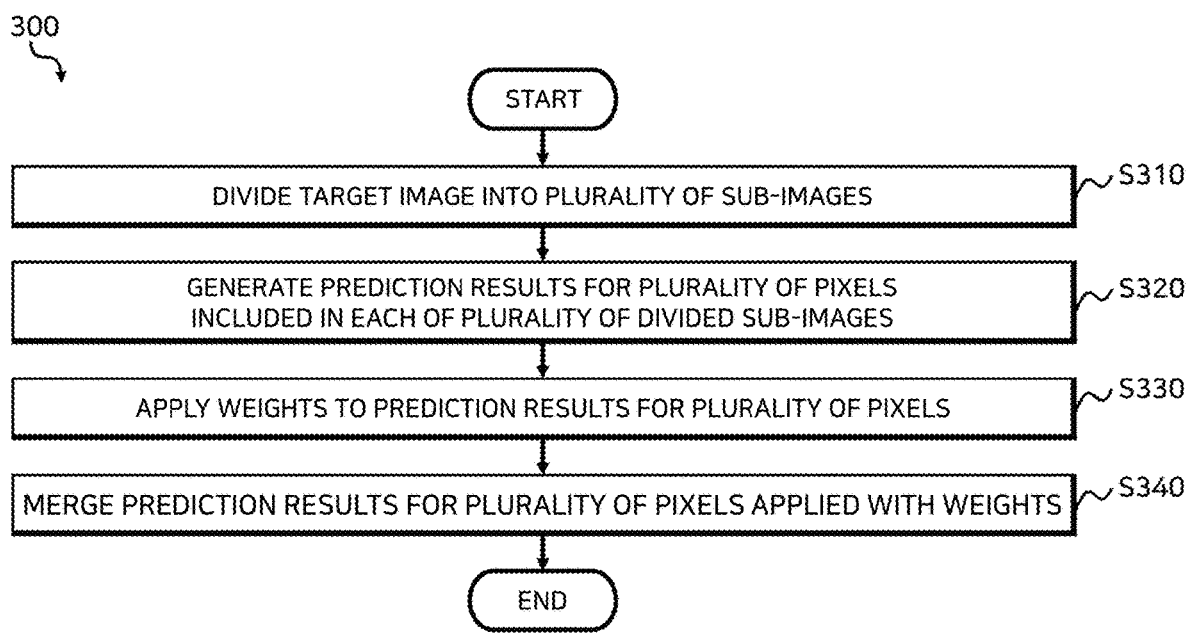
FIG. 3 is a flowchart illustrating a method for performing a prediction work on a target image according to an embodiment.

FIG. 3 is a flowchart illustrating a method 300 for performing a prediction work on a target image according to an embodiment. In an embodiment, the method 300 for performing a prediction work on a target image may be performed by a processor (e.g., at least one processor of the information processing system). As illustrated, the method 300 for performing the prediction work on the target image may be initiated by the processor by dividing the target image into a plurality of sub-images, at 5310. The processor may divide the target image such that a portion of a first image included in the plurality of sub-images overlaps with a portion of a second image adjacent to the first image. Here, each of the first image and the second image may be one or more sub-images.

Then, the processor may generate prediction results for a plurality of pixels included in each of the plurality of divided sub-images, at 5320. In an embodiment, the processor may determine a class for each of the plurality of pixels, and generate a prediction result including the determined class. In this case, the class may be one of a plurality of classes representing a plurality of objects. For example, the processor may input each of the plurality of divided sub-images to the segmentation machine learning model to output a class for each of a plurality of pixels included in each of the plurality of sub-images. In addition, the processor may use the class for each of the plurality of pixels to determine values for a plurality of channels corresponding to the plurality of classes. Additionally, the processor may generate an array corresponding to the prediction results for the plurality of pixels based on the determined values for the plurality of channels.

The processor may apply weights to the prediction results for the generated plurality of pixels, at 5330. In an embodiment, the processor may apply bilinear weights to the prediction results for the pixels included in each of the plurality of sub-images. Here, the bilinear weights may include a weight corresponding to each pixel calculated through bilinear interpolation. In an embodiment, when the prediction result includes a plurality of channels, the processor may apply weights to each of the plurality of channels. The processor may merge the prediction results for the plurality of pixels applied with the weights, at 5340. In an embodiment, the processor may merge a prediction result applied with a first weight corresponding to the pixel included in the overlapping portion of the first image, with a prediction result applied with a second weight corresponding to the pixel included in the overlapping portion of the second image.

Figure 4:
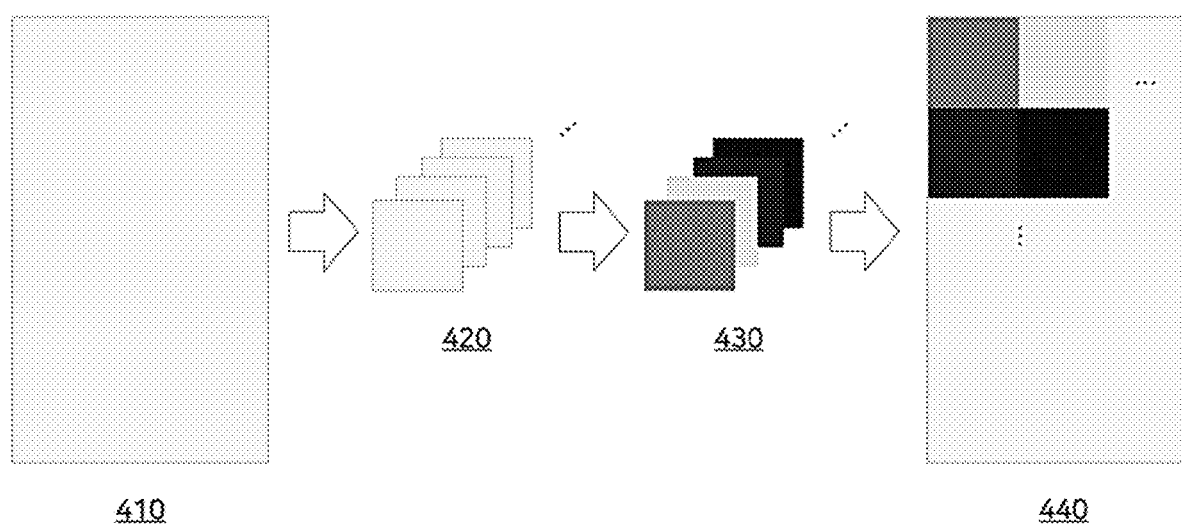
FIG. 4 illustrates an example of performing a prediction work on a target image according to an embodiment.

FIG. 4 illustrates an example of performing a prediction work on a target image according to an embodiment. The processor may divide a target image 410 into a plurality of sub-images 420 to perform a prediction work on the target image 410. In an embodiment, the processor may determine the size and/or the number of the plurality of sub-images 420 based on work speed, computational resource, memory, etc., and divide the target image 410 into a plurality of sub-images 420 based on the determined size and/or number of the sub-images 420. In FIG. 4, a plurality of sub-images 420 are illustrated as having the same size, but embodiments are not limited thereto, and the sizes of at least some images of the plurality of sub-images 420 may be different from each other.

The processor may perform segmentation on each of the plurality of divided sub-images 420 to generate a plurality of prediction results 430 corresponding to the plurality of sub-images 420. In an embodiment, the processor may determine a class for each of a plurality of pixels included in the plurality of sub-images, and generate a prediction result including the determined class. In this example, the class may be one of a plurality of classes representing a plurality of objects (e.g., each cell, tissue and/or structure, etc.). In FIG. 4, the prediction result for each sub-image is displayed using grayscale colors, but embodiments are not limited thereto, and various methods for representing a class may be applied.

The processor may use the class for each of the plurality of pixels to determine values for a plurality of channels corresponding to the plurality of classes. In addition, the processor may generate an array corresponding to the prediction results for the plurality of pixels based on the determined values for the plurality of channels. Here, the prediction result 430 for each sub-image may have the number of the channels identical to the number of targeted classes. For example, when the processor performs segmentation for two classes of "cancer cells" and "lymphocytes" in the sub-image, the prediction result may have two channels.

The processor may generate a final prediction result 440 for the target image by arranging and merging the prediction results 430 according to the respective positions of the plurality of sub-images 420 in the target image 410. In this example, the target image 410 may be a whole slide image that is an image captured with a microscope, and the whole slide image may be divided into a region in which tissue is placed on a glass slide (that is, tissue region as a target of the prediction work) and a region in which the tissue is not placed. Alternatively, the target image 410 may be a partial image corresponding to the tissue region in the whole slide image.

In FIG. 4, the processor divides the target image 410 into the plurality of sub-images 420 such that the plurality of sub-images 420 cover the entire region of the target image 410, but embodiments are not limited thereto. For example, the processor may divide the plurality of sub-images 420 to cover the tissue region that is a portion of the target image 410.

Figure 5:
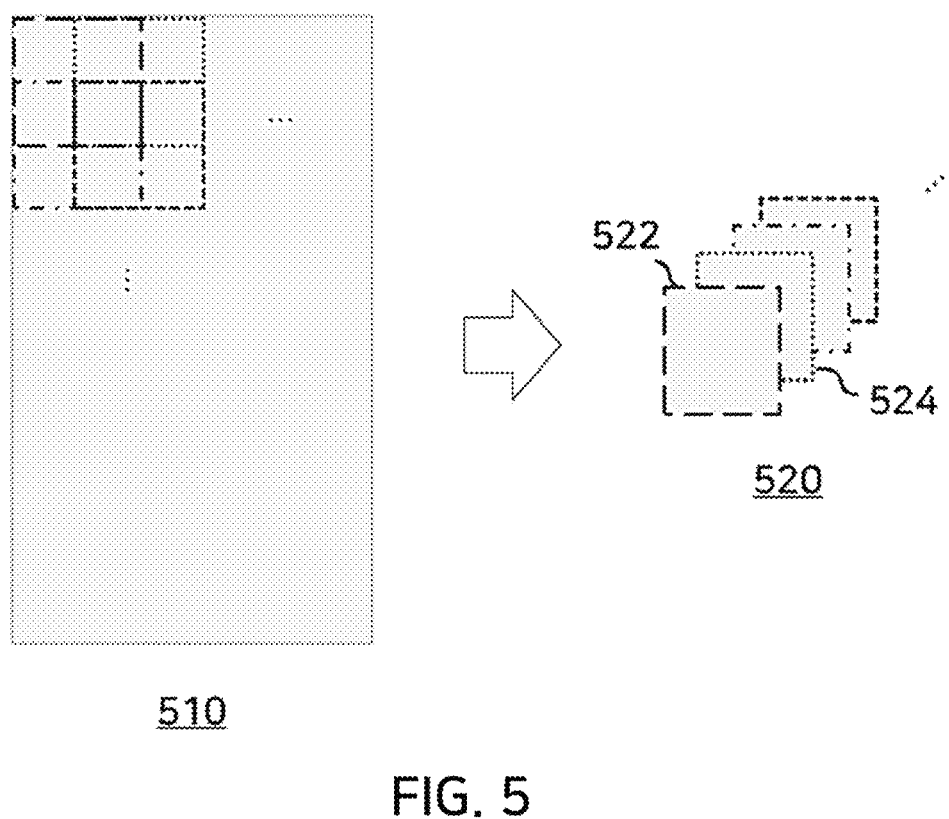
FIG. 5 illustrates an example of dividing a target image into a plurality of sub-images according to an embodiment.

FIG. 5 illustrates an example of a dividing a target image 510 into a plurality of sub-images 520 according to an embodiment. In an embodiment, in order to further improve the performance of the final prediction result generated by merging the prediction result for each of the plurality of sub-images, when dividing the target image 510 into the plurality of sub-images 520, the processor may divide the sub-images such that each sub-image partially overlaps with another adjacent sub-image. In general, the periphery of the sub-image has a narrower receptive field than the center and may have a lower performance of segmentation.

The processor may divide the target image 510 such that the plurality of sub-images 520 have overlapping regions (that is, regions overlapping with adjacent sub-images), thereby improving the segmentation performance of the target image 510. For example, as illustrated, the processor may divide the image such that a portion of a first image 522 that is a sub-image of the target image overlaps with a portion of a second image 524 that is another sub-image of the target image. In this case, the first image 522 and the second image 524 may be the sub-images adjacent to each other. For example, as illustrated in the target image 510 of FIG. 5, four sub-images adjacent to each other including the first image 522 and the second image 524 may be divided to overlap with each other.

As the size of the region where the plurality of sub-images overlap with each other increases, the prediction performance of the processor may be improved. However, as the size of the region where the plurality of sub-images overlap with each other increases, the processor may have to process the larger and/or more sub-images. Accordingly, the processor may determine the size of the region where the plurality of sub-images overlap with each other such that optimal prediction performance can be achieved, in consideration of work speed, computational resource, memory, prediction performance, etc. The processor may perform prediction works on a plurality of pixels included in each of the plurality of sub-images 520 divided as described above.

Although FIG. 5 illustrates an example in which the target image 510 is divided into the plurality of sub-images 520 having the same size, embodiments are not limited thereto, and the target image 510 may be divided into a plurality of sub-images having different sizes. In addition, in FIG. 5, although the processor divides the target image 510 such that each of the plurality of sub-images 520 has the same size overlapping regions as the other adjacent sub-images, embodiments are not limited thereto, and the processor may divide the target image 510 such that sizes of overlapping regions are different from each other. In addition, although the target image 510 and the sub-image 520 are illustrated in the shape of quadrangles in FIG. 5, embodiment is not limited thereto, and may have a different shape such as a polygon such as a triangle, a trapezoid, etc., a circle, or a curved shape, or the like.

Figure 6:
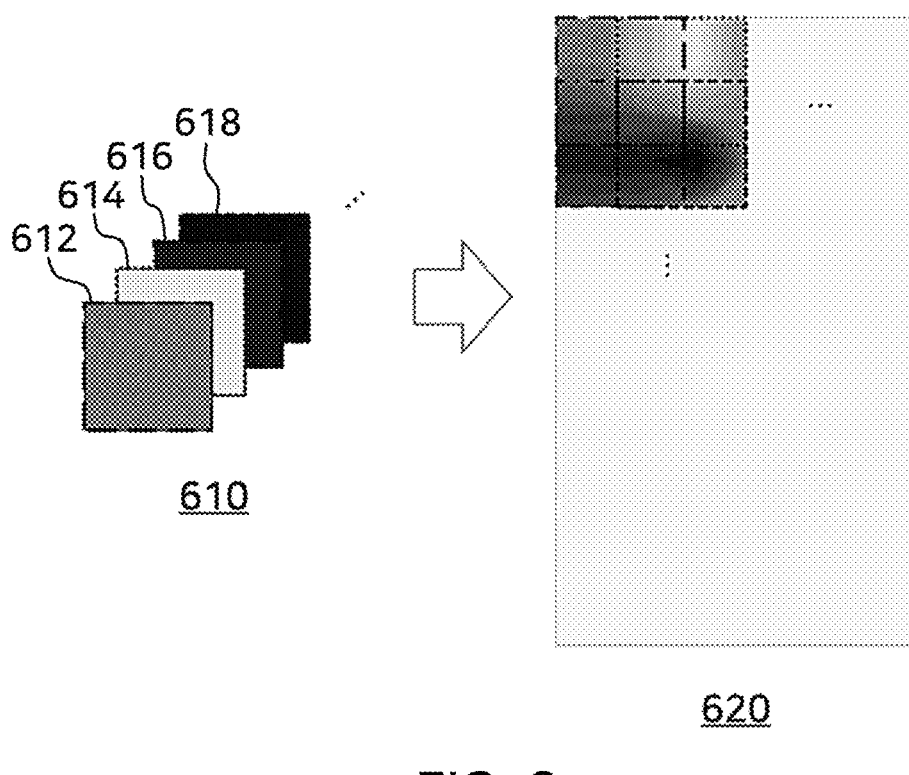
FIG. 6 illustrates an example of merging prediction results for sub-images to generate a final prediction result for a target image according to an embodiment.

FIG. 6 illustrates an example of merging prediction results 610 for sub-images to generate a final prediction result 620 for a target image according to an embodiment. As illustrated in FIG. 6, a prediction result of each of the plurality of sub-images may be indicated by a grayscale color, but is not limited thereto, and may be indicated by any information that can represent the prediction result. For example, the prediction result of each of the plurality of sub-images may be indicated by an RGB color, an one-dimensional black and white, a multi-dimensional image, etc. In FIG. 6, among the colors displayed as prediction results, a color of a region 612 displayed as a prediction result may represent a cancer epithelium class, a color of a region 614 displayed as a prediction result may represent a lymphocyte cell class, a color of a region 616 displayed as a prediction result may represent a cancer stromal class, and a color of a region 618 displayed as a prediction result may represent a normal cell.

The processor may apply weight masks to the prediction result for each of the plurality of sub-images. That is, the processor may apply weights to the prediction results for a plurality of pixels included in each of the plurality of sub-images. In an embodiment, the processor may apply bilinear weights to the prediction results for a plurality of pixels included in each of the plurality of sub-images. Here, a bilinear weight is a weight corresponding to each pixel and may be calculated through bilinear interpolation. In another embodiment, when the prediction results for a plurality of pixels have a plurality of channels, the processor may apply weights to each of the plurality of channels.

Then, the processor may generate the final prediction result 620 for the target image by arranging and merging the prediction result for each of the plurality of sub-images applied with weights according to the position of each of the plurality of sub-images in the target image. In an embodiment, the processor may merge the prediction results for the plurality of pixels applied with the weights. For example, the processor may merge prediction results applied with weights corresponding to pixels included in the overlapping portion of the first image, with prediction results applied with weights corresponding to pixels included in the overlapping portion of the second image. The processor may merge the prediction result for each of the sub-images applied with the bilinear weights to output the final prediction result 620 having smooth boundaries as shown.

In FIG. 6, although only the prediction results 610 for four sub-images among the plurality of sub-images are illustrated as an example, each of the prediction results may be merged with the prediction result for other sub-images adjacent each other, in addition to the prediction results 610 illustrated as an example in FIG. 6.

Figure 7:
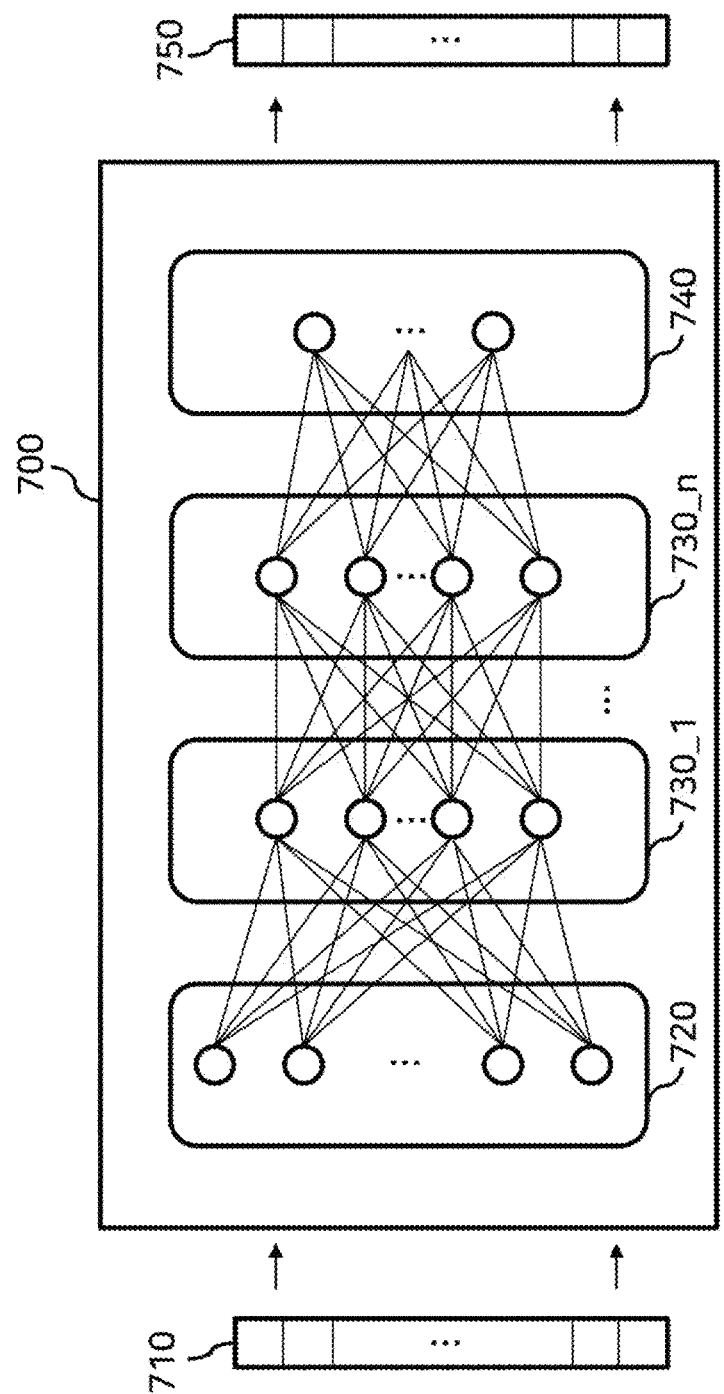
FIG. 7 illustrates an example of an artificial neural network model according to an embodiment.

FIG. 7 illustrates an example of an artificial neural network model 700 according to an embodiment. In machine learning technology and cognitive science, an artificial neural network model 700 as an example of the machine learning model refers to a statistical learning algorithm implemented based on a structure of a biological neural network, or to a structure that executes such algorithm.

According to an embodiment, the artificial neural network model 700 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 700 may include any probability model, neural network model, etc., that is used in an artificial intelligence learning method such as machine learning, deep learning, etc.

According to an embodiment, the artificial neural network model 700 may include an artificial neural network model configured to receive a target image or a sub-image and output a class for each of the pixels in the image. For example, the artificial neural network model 700 may include an artificial neural network model configured to receive a pathology slide image or at least one patch included in the pathology slide image and output a class for each of the pixels.

The artificial neural network model 700 is implemented as a multilayer perceptron (MLP) formed of multiple nodes and connections between them. The artificial neural network model 700 according to an embodiment may be implemented using one of various artificial neural network model structures including the MLP. As illustrated in FIG. 5, the artificial neural network model 700 includes an input layer 720 to receive an input signal or data 710 from the outside, an output layer 740 to output an output signal or data 750 corresponding to the input data, and (n) number of hidden layers 730_1 to 730_n (where n is a positive integer) positioned between the input layer 720 and the output layer 740 for receiving a signal from the input layer 720, extract features, and transmit the features to the output layer 740. In an example, the output layer 740 receives signals from the hidden layers 730_1 to 730_n and outputs them to the outside.

The method for training the artificial neural network model 700 includes a supervised learning method that trains to optimize for solving a problem with inputs of teacher signals (correct answers), and an unsupervised learning method that does not require a teacher signal. The information processing system may train the artificial neural network model 700 with the supervise learning method and/or the unsupervised learning such that class information for each of a plurality of pixels included in the target image and/or sub-images can be predicted.

The artificial neural network model 700 trained as described above may be stored in a memory (not illustrated) of the information processing system, and, in response to an input of the target image or sub-image received from the communication module and/or memory, the artificial neural network model 700 may output the class information for each of a plurality of pixels included in the target image or sub-image.

According to an embodiment, for the machine learning model capable of performing segmentation, that is, for the artificial neural network model 700, an input variable may be a pathology slide image or at least one patch included in the pathology slide image. For example, the input variable input to the input layer 720 of the artificial neural network model 700 may be an image vector 710 including the pathology slide image or at least one patch included in the pathology slide image as one vector data element. In response to an input of an image including at least a portion of the pathology slide image, the output variable output from the output layer 740 of the artificial neural network model 700 may be a vector 750 that represents or characterizes class information for each of a plurality of pixels included in at least the portion of the pathology slide image. In addition, the output layer 740 of the artificial neural network model 700 may be configured to output a vector representing a reliability and/or an accuracy of the output class information. In the present disclosure, the output variable of the artificial neural network model 700 is not limited to the types described above, and may include any information/data representing the class information.

As described above, the input layer 720 and the output layer 740 of the artificial neural network model 700 are respectively matched with a plurality of output variables corresponding to a plurality of input variables, and the synaptic values between nodes included in the input layer 720, and the hidden layers 730_1 to 730_n, and the output layer 740 are adjusted, so that training can be processed to extract a correct output corresponding to a specific input. Through this training process, the features hidden in the input variables of the artificial neural network model 700 can be figured out, and the synaptic values (or weights) between the nodes of the artificial neural network model 700 can be adjusted so that there can be a reduced error between the target output and the output variable calculated based on the input variable. Using the artificial neural network model 700 trained as described above, class information for a plurality of pixels included in the input image may be output in response to the input pathology slide image or at least one patch included in the pathology slide image.

Figure 8:
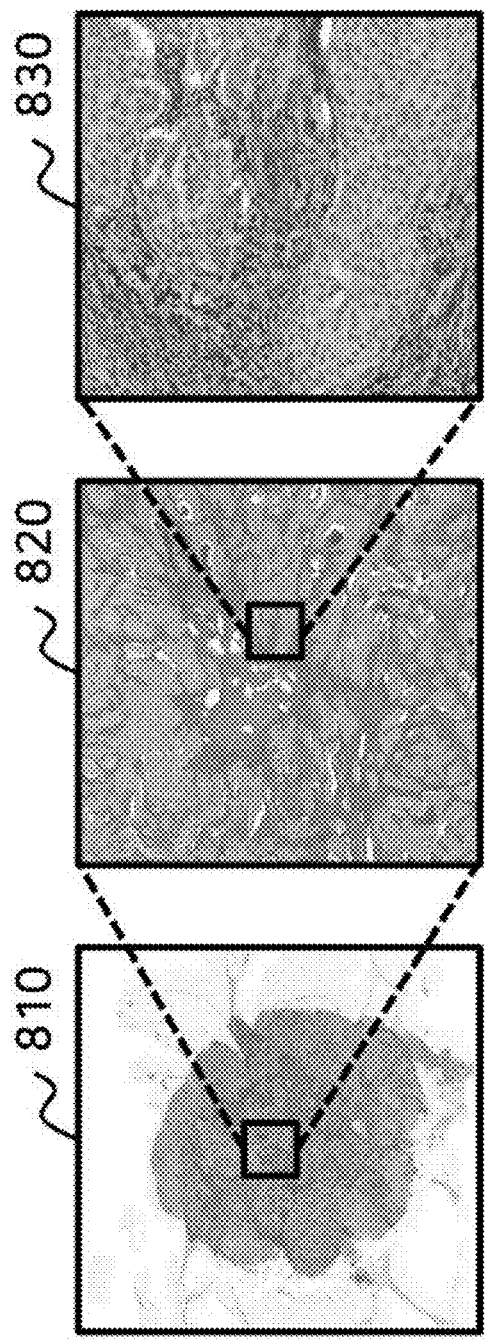
FIG. 8 illustrates an example of a target image and a sub-image, which are a pathology slide image and at least one patch included in the pathology slide image according to an embodiment.

FIG. 8 illustrates an example of a target image and a sub-image, which are a pathology slide image and at least one patch included in the pathology slide image according to an embodiment. As illustrated, a pathology slide image 810 may refer to a digital image generated by capturing, through a microscope and a camera, a pathology slide stained and/or fixed through a series of chemical treatments of at least a portion of the tissue obtained from the human body. For example, the pathology slide image 810 may be stained by hematoxylin and eosin (H&E) staining technique, but is not limited thereto, and may include an image generated by capturing, through a microscope and a camera, a pathology slide stained with already known different staining technique(s).

The target image according to embodiments of the present disclosure may be a pathology slide image 810, and the sub-image may be a patch 820 included in the pathology slide image 810. Alternatively, the target image according to embodiments of the present disclosure may be the patch 820 included in the pathology slide image 810, and the sub-image may be a patch 830 of a smaller unit than the target image, i.e., the patch 820. In this case, the sub-image, that is, the patch 830 of a small unit may be included in the target image, that is, the patch 820.

The processor may input the pathology slide image 810 and/or the patches 820 and 830 into a machine learning model to perform a prediction work on the pathology slide image 810 and/or the patches 820 and 830, and generate prediction results. According to an embodiment, the processor may input the pathology slide image 810 and/or the patches 820 and 830 into the machine learning model and output a plurality of class for the plurality pixels included in the pathology slide images 810 and/or the patches 820 and 830. Here, the machine learning model may be a segmentation machine learning model (e.g., the artificial neural network model 700 of FIG. 7) trained to receive an image as an input and output a class for each of a plurality of pixels included in the image. In an example, various segmentation algorithms may be applied to the segmentation machine learning model, which may be a semantic segmentation machine learning model and/or an instance segmentation machine learning model, for example.

As a prediction result according to embodiments of the present disclosure, according to the plurality of class information output by the processor, class information for at least some of the plurality of pixels included in the pathology slide image 810 and/or the patches 820 and 830 may be tagged and/or indicated. According to an embodiment, the first region of the pathology slide image 810 may indicate the class information of cancer stroma, and the second region may indicate class information of cancer epithelium. For example, the first region corresponding to the cancer stromal region may be colored a first color (ex: purple), and the second region corresponding to the cancer epithelium region may be colored a second color (ex: sky blue). Alternatively, the class information may be expressed in various visual indications such as region indications, shape indications, other color indications, text, or the like.

The pathology slide image 810 may be provided to the processor as a target image in a compressed form of an original image, and upon segmentation of the compressed image into a plurality of patches 820 as a plurality of sub-images, de-compressed images corresponding to the plurality of patches 820 may be provided to the processor. Likewise, an enlarged image of the patch 830 of a small unit included in the patch 820 may be acquired. In FIG. 8, the images corresponding to the patch 820 and the patch 830 of a smaller unit are each enlarged at a specific magnification, but embodiments are not limited thereto, and the pathology slide image and/or the image corresponding to the patches included therein may be enlarged or reduced at various magnifications.

Figure 9:
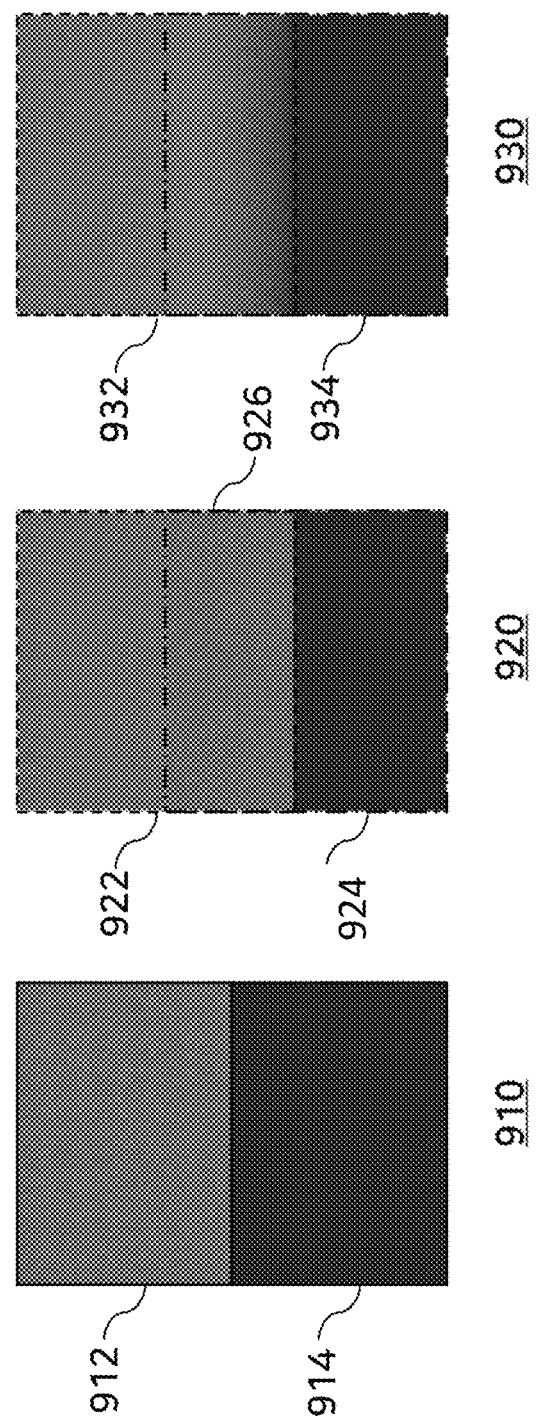
FIG. 9 illustrates an example of a prediction result for a target image, generated by merging the prediction results for two sub-images according to some embodiments.

FIG. 9 illustrates an example of a prediction result for a target image, generated by merging the prediction results for two sub-images according to some embodiments. The processor may divide the target image into a first sub-image and a second sub-image, and perform a prediction work on each of the divided first sub-image and second sub-image. That is, the prediction work may be performed on a plurality of pixels included in each of the first sub-image and the second sub-image. Then, the processor may generate prediction result for the target image by merging the prediction results for the first sub-image and the second sub-image.

A first prediction result 910 represents a result of dividing the target image in a way such that the first sub-image and the second sub-image do not overlap with each other, and simply arranging and merging sub-prediction results of the first sub-image and the second sub-image without overlap. In this case, it can be confirmed that, when a first sub-prediction result 912 for the first sub-image and a second sub-prediction result 914 for the second sub-image are completely different, the prediction results are not smoothly connected in the vicinity of the boundary between the first sub-image and the second sub-image. That is, in certain region of the final prediction result 910 generated by merging the sub-prediction result of each of the sub-images without overlapping regions, the resultant prediction appears as if it has discontinuity. Accordingly, as shown, a clear boundary may appear between the first sub-prediction result 912 and the second sub-prediction result 914. Considering the human cell and/or histological formation, with such a clear boundary, it may be difficult to guarantee the accuracy of the prediction result in the vicinity of the boundary between the first sub-image and the second sub-image.

A second prediction result 920 represents a result of dividing the first sub-image and the second sub-image overlappingly with each other, and merging sub-prediction results by calculating a sub-prediction result corresponding to an overlapping region between a first sub-prediction result 922 of the first sub-image and a second sub-prediction result 924 of the second sub-image as average values of the first sub-prediction result 922 of the first sub-image and the second sub-prediction result 924 of the second sub-image. In this case, when the output sub-prediction results are different for each sub-image, artifact may occur, in which the sub-prediction results appear as if they are discontinued at the boundary lines where the sub-images overlap with each other. As shown, a third sub-prediction result 926 of a region where the first sub-prediction result 922 and the second sub-prediction result 924 overlap with each other, represents an intermediate value of the first sub-prediction result 922 and the second sub-prediction result 924. Accordingly, the boundary between the first sub-prediction result 922 and the third sub-prediction result 926 and the boundary between the third sub-prediction result 926 and the second sub-prediction result 924 are clearly distinguishable, as in the case of the first prediction result 910. In consideration of the human cell and/or histological formation, it may be difficult to guarantee the accuracy of the second prediction result 920.

A third prediction result 930 represents a result of dividing the first sub-image and the second sub-image overlappingly with each other, and merging sub-prediction results by applying different weights (e.g., linear weights) to the prediction results (i.e., a first sub-prediction result 932) for the plurality of pixels included in the first sub-image and the prediction results (i.e., a second sub-prediction result 934) for the plurality of pixels included in the second sub-image. In this case, unlike the first prediction result 910 and the second prediction result 920, it can be confirmed that there is a smooth boundary between the prediction results for the sub-image. For example, as shown, a smooth boundary may appear between the first sub-prediction result 932 and the second sub-prediction result 934. Accordingly, it is possible to prevent the occurrence of artifact of discontinuity in the final prediction result for the target image, and the accuracy of the third prediction result 930 can be improved compared to those of the first prediction result 910 and the second prediction result 920.

In FIG. 9, the prediction result for the target image is generated by merging the sub-prediction results for two sub-images, but embodiments are not limited thereto, and the prediction result for the target image may be generated by merging sub-prediction results for a plurality of sub-images, including three or more sub-images.

FIG. 10 illustrates an example of prediction results 1020 and 1030 for a pathology slide image 1010 generated by merging prediction results for a plurality of patches according to embodiments of the present disclosure. The processor may divide the pathology slide image 1010 into a plurality of patches, and perform a prediction work on a plurality of pixels included in each of the plurality of divided patches. In this case, each of the plurality of divided patches may partially overlap with adjacent patches. Then, the processor may apply weights to the prediction results for a plurality of pixels included in each of the plurality of patches, merge the prediction results for the plurality of pixels applied with the weights, and generate a prediction result for the pathology slide image 1010.

According to an embodiment, the first prediction result 1020 may show a result of applying an average weight to the prediction results for the plurality of pixels included in each of the plurality of patches, and merging the prediction results for the plurality of pixels applied with the average weight. That is, the processor may calculate the prediction results of the overlapping region of the plurality of patches as the average values of the prediction results for the overlapping pixels. As shown in the dotted line box region of the first prediction result 1020, the boundary lines of the patch may be clearly revealed, and the artifact of discontinuity in the prediction results may appear. Accordingly, when considering human cells and/or histological formation, it may be difficult to guarantee the accuracy of the first prediction result 1020.

According to another embodiment, the second prediction result 1030 may show a result of applying bilinear weights to the prediction results for a plurality of pixels included in each of the plurality of patches, and merging the prediction results for the plurality of pixels applied with the bilinear weights. Unlike the first prediction result 1020 with the clear boundary lines appearing in the dotted box region, in the second prediction result 1030, it can be confirmed that the artifact of discontinuity in the result does not occur between the prediction results of the plurality of patches. When comparing the two prediction results, the method for merging the prediction results for patches by applying the bilinear weight to the prediction results can improve the accuracy of the prediction result for the pathology slide image 1010, more than that of the method for merging by applying the average weight.

In FIG. 10, the prediction results 1020 and 1030 for the pathology slide image 1010 are illustrated as black and white images, but embodiments are not limited thereto. For example, the prediction result for the pathology slide image may be displayed as RGB color and/or a multidimensional image, etc.

Figure 11:
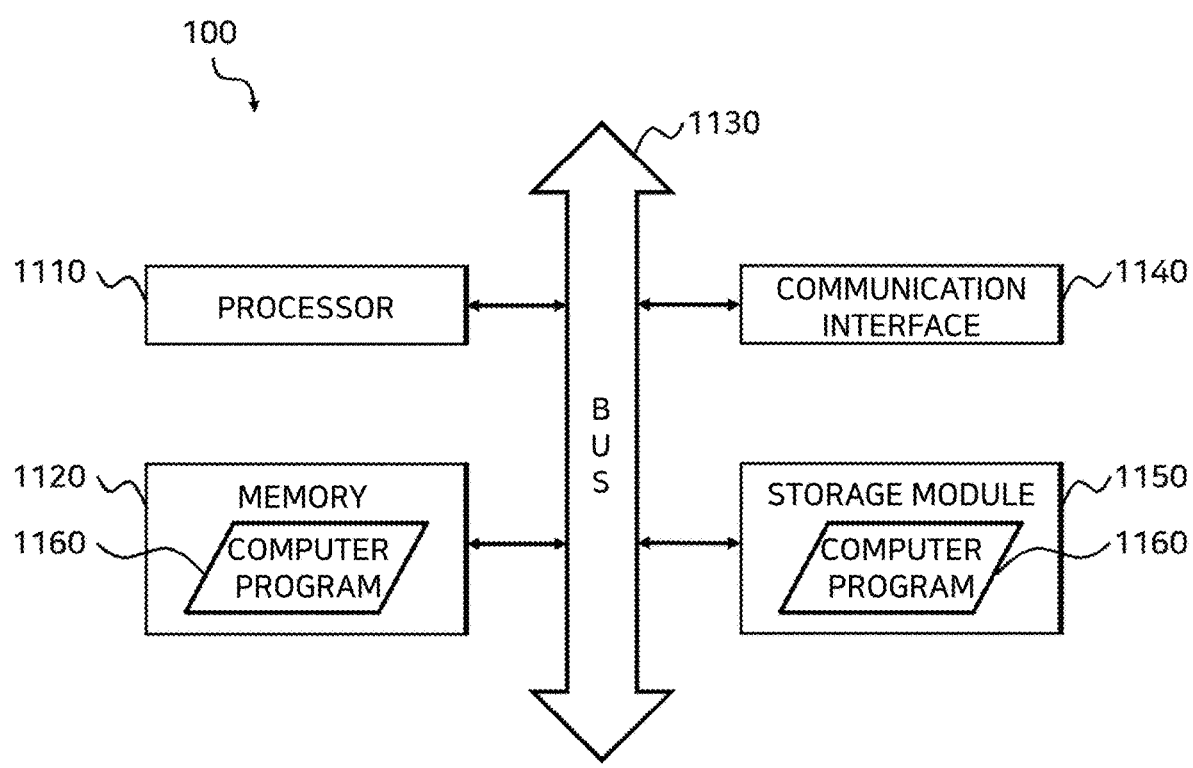
FIG. 11 illustrates a configuration of an exemplary system for performing a prediction work on a target image according to an embodiment.

FIG. 11 illustrates a configuration of an exemplary system for performing a prediction work on a target image according to an embodiment. As illustrated, the information processing system 100 may include one or more processors 1110, a bus 1130, a communication interface 1140, a memory 1120 for loading a computer program 1160 to be executed by the processors 1110, and a storage module 1150 for storing the computer program 1160. However, only the components related to the embodiment are illustrated in FIG. 11. Accordingly, those skilled in the art to which the present disclosure pertains will be able to recognize that other general-purpose components may be further included in addition to the components shown in FIG. 11.

The processors 1110 control the overall operation of components of the information processing system 100. The processors 1110 may be configured to include a central processing unit (CPU), a micro processor unit (MPU), a micro controller unit (MCU), a graphic processing unit (GPU), or any type of processor well known in the technical field of the present disclosure. In addition, the processors 1110 may perform an arithmetic operation on at least one application or program for executing the method according to the embodiments of the present disclosure. The information processing system 100 may include one or more processors.

The memory 1120 may store various types of data, commands, and/or information. The memory 1120 may load one or more computer programs 1160 from the storage module 1150 in order to execute the method/operation according to various embodiments of the present disclosure. The memory 1120 may be implemented as a volatile memory such as RAM, although the technical scope of the present disclosure is not limited thereto.

The bus 1130 may provide a communication function between components of the information processing system 100. The bus 1130 may be implemented as various types of buses such as an address bus, a data bus, a control bus, etc.

The communication interface 1140 may support wired/wireless Internet communication of the information processing system 100. In addition, the communication interface 1140 may support various other communication methods in addition to the Internet communication. To this end, the communication interface 1140 may be configured to include a communication module well known in the technical field of the present disclosure.

The storage module 1150 may non-temporarily store one or more computer programs 1160. The storage module 1150 may be configured to include a nonvolatile memory such as a read only memory (ROM), an erasable programmable ROM (EPROM), an electrically erasable programmable ROM (EEPROM), a flash memory, etc., a hard disk, a detachable disk, or any type of computer-readable recording medium well known in the art to which the present disclosure pertains.

The computer program 1160 may include one or more instructions that, when loaded into the memory 1120, cause the processors 1110 to perform an operation/method in accordance with various embodiments of the present disclosure. That is, the processors 1110 may perform operations/methods according to various embodiments of the present disclosure by executing one or more instructions.

For example, the computer program 1160 may include one or more instructions to perform operations of dividing a target image into a plurality of sub-images, generating prediction results for a plurality of pixels included in each of the plurality of divided sub-images, applying weights to the prediction results for the plurality of pixels, and merging the prediction results for the plurality of pixels applied with the weights. In this case, the system for performing a prediction work on a target image according to some embodiments of the present disclosure may be implemented through the information processing system 100.

The above description of the present disclosure is provided to enable those skilled in the art to make or use the present disclosure. Various modifications of the present disclosure will be readily apparent to those skilled in the art, and the general principles defined herein may be applied to various modifications without departing from the spirit or scope of the present disclosure. Thus, the present disclosure is not intended to be limited to the examples described herein but is intended to be accorded the broadest scope consistent with the principles and novel features disclosed herein.

Although example implementations may refer to utilizing aspects of the presently disclosed subject matter in the context of one or more standalone computer systems, the subject matter is not so limited, and they may be implemented in conjunction with any computing environment, such as a network or distributed computing environment. Furthermore, aspects of the presently disclosed subject matter may be implemented in or across a plurality of processing chips or devices, and storage may be similarly influenced across a plurality of devices. Such devices may include PCs, network servers, and handheld devices.

Although the present disclosure has been described in connection with some embodiments herein, it should be understood that various modifications and changes can be made without departing from the scope of the present disclosure, which can be understood by those skilled in the art to which the present disclosure pertains. Further, such modifications and changes are intended to fall within the scope of the claims appended herein.

What is claimed is:

1. A method for performing a prediction work on a whole slide image (WSI), the method comprising:
   dividing the WSI into a plurality of sub-images such that a portion of a first image included in the plurality of sub-images overlaps with a portion of a second image adjacent to the first image, wherein the WSI corresponds to a pathology slide generated by staining human tissue obtained from a human body;
   separately generating individual prediction results for individual pixels among a plurality of pixels included in each of the plurality of divided sub-images;
   separately applying individual weights to the individual prediction results for the plurality individual pixels such that weights applied to first prediction results for first pixels in the plurality of pixels are larger than weights applied to second prediction results for second pixels in the plurality of pixels, wherein distances of the first pixels to a center in each of the plurality of divided sub-images are closer than distances of the second pixels to the center;
   separately merging the individual prediction results applied with the individual weights for the individual pixels that are included in an overlapping portion of the first image and the second image; and separately generating final prediction results for the individual pixels based on the merged prediction results for the individual pixels and final weight values for the individual pixels, wherein a final weight value for an individual pixel corresponds to a sum of weights applied to the individual pixel for each of the sub-images.

2. The method according to claim 1, wherein the applying the weights to the prediction results for the plurality of pixels includes applying bilinear weights to the prediction results for the plurality of pixels.

3. The method according to claim 2, wherein the bilinear weights are weights used for bilinear interpolation applied to the prediction results for the plurality of pixels, and each of the bilinear weights is calculated as a value corresponding to each of the plurality of pixels.

4. The method according to claim 2, wherein the merging the prediction results applied with the weights for the plurality of pixels includes merging a prediction result applied with a first weight corresponding to a pixel included in the overlapping portion of the first image, with a prediction result applied with a second weight corresponding to a pixel included in the overlapping portion of the second image.

5. The method according to claim 1, wherein the generating the prediction results for the plurality of pixels included in each of the plurality of divided sub-images includes:
  determining a class for each of the plurality of pixels, wherein the class is one of a plurality of classes representing a plurality of objects; and
  generating a prediction result including the determined class.

6. The method according to claim 5, wherein the determining the class for each of the plurality of pixels includes inputting each of the plurality of divided sub-images to a segmentation machine learning model to output a class for each of the plurality of pixels included in each of the plurality of sub-images.

7. The method according to claim 5, wherein the generating the prediction result including the determined class includes determining values for a plurality of channels corresponding to the plurality of classes by using the class for each of the plurality of pixels.

8. The method according to claim 7, wherein the generating the prediction result including the determined class includes generating an array corresponding to the prediction results for the plurality of pixels based on the determined values for the plurality of channels.

9. The method according to claim 7, wherein the applying the weights to the prediction results for the plurality of pixels includes applying each of the weights to each of the plurality of channels.

10. An information processing system comprising:
a memory storing one or more instructions; and
a processor configured to execute the stored one or more instructions to:
  divide a whole slide image (WSI) into a plurality of sub-images such that a portion of a first image included in the plurality of sub-images overlaps with a portion of a second image adjacent to the first image, wherein the WSI corresponds to a pathology slide generated by staining human tissue obtained from a human body;
  separately generate individual prediction results for individual pixels among a plurality of pixels included in each of the plurality of divided sub-images;
  separately apply individual weights to the individual prediction results for the individual pixels such that weights applied to first prediction results for first pixels in the plurality of pixels are larger than weights applied to second prediction results for second pixels in the plurality of pixels, wherein distances of the first pixels to a center in each of the plurality of divided sub-images are closer than distances of the second pixels to the center; and
  separately merge the individual prediction results applied with the individual weights for the individual pixels that are included in an overlapping portion of the first image and the second image; and
  separately generate final prediction results for the individual pixels based on the merged prediction result for the individual pixels and a final weight values for the individual pixels, wherein a final weight value for an individual pixel corresponds to a sum of the weights applied to the individual pixel for each of the sub-images.

11. The information processing system according to claim 10, wherein the processor is further configured to execute the stored one or more instructions to apply bilinear weights to the prediction results for the plurality of pixels.

12. The information processing system according to claim 11, wherein the bilinear weight are weights used for bilinear interpolation applied to the prediction results for the plurality of pixels, and each of the bilinear weights is calculated as a value corresponding to each of the plurality of pixels.

13. The information processing system according to claim 11, wherein the processor is further configured to execute the stored one or more instructions to merge a prediction result applied with a first weight corresponding to a pixel included in the overlapping portion of the first image, with a prediction result applied with a second weight corresponding to a pixel included in the overlapping portion of the second image.

14. The information processing system according to claim 10, wherein the processor is further configured to execute the stored one or more instructions to determine a class for each of the plurality of pixels, wherein the class is one of a plurality of classes representing a plurality of objects, and generate a prediction result including the determined class.

15. The information processing system according to claim 14, wherein the processor is further configured to execute the stored one or more instructions to input each of the plurality of divided sub-images to a segmentation machine learning model to output a class for each of the plurality of pixels included in each of the plurality of sub-images.

16. The information processing system according to claim 14, wherein the processor is further configured to execute the stored one or more instructions to determine values for a plurality of channels corresponding to the plurality of classes by using the class for each of the plurality of pixels.

17. The information processing system according to claim 16, wherein the processor is further configured to execute the stored one or more instructions to generate an array corresponding to the prediction results for the plurality of pixels based on the determined values for the plurality of channels.

18. The information processing system according to claim 16, wherein the processor is further configured to execute the stored one or more instructions to apply each of the weights to each of the plurality of channels.

19. The method according to claim 5,
wherein the generating the prediction results comprises:
determining a class for each of the plurality of pixels from among a plurality of classes, the plurality of classes corresponding to cells, tissues, or structures in the human body, and wherein the plurality of classes comprise a normal cell class, a cancer epithelium class, a cancer stromal class, and a lymphocyte cell class; and
generating a prediction result including the determined class.

\* \* \* \* \*